July 31, 1951 A. H. THOMPSON 2,562,245

RECORD SPEED ADAPTER FOR PHONOGRAPHS

Filed March 29, 1949 2 Sheets-Sheet 1

INVENTOR.
Arthur H. Thompson
BY Otis A. Earl
Attorney.

July 31, 1951 A. H. THOMPSON 2,562,245

RECORD SPEED ADAPTER FOR PHONOGRAPHS

Filed March 29, 1949 2 Sheets-Sheet 2

INVENTOR.
Arthur H. Thompson
BY Otto A. Earl
Attorney.

Patented July 31, 1951

2,562,245

UNITED STATES PATENT OFFICE 2,562,245

RECORD SPEED ADAPTER FOR PHONOGRAPHS

Arthur H. Thompson, Grand Rapids, Mich., assignor to Carbonneau Industries, Inc., Grand Rapids, Mich.

Application March 29, 1949, Serial No. 84,108

19 Claims. (Cl. 274—9)

This invention relates to improvements in record speed adapter for phonographs.

The principal objects of this invention are:

First, to provide a simple attachment or accessory which will permit phonograph records of non-standard speed variety to be played on a standard speed phonograph.

Second, to provide an inexpensive device for converting the rotational speed of a standard phonograph turntable to a different speed in a record to be played.

Third, to provide a record speed adapter for frictionally driving a phonograph record from the turntable of a phonograph at a different speed than the turntable.

Fourth, to provide a record speed adapter for phonographs which is easily adjustable for driving records at two or more speed ratios with respect to a phonograph turntable.

Fifth, to provide a record speed adapter for phonographs which functions to drive a record at a different speed than the phonograph turntable without the use of gears or brakes.

Other objects and advantages of my invention will be apparent from a consideration of the following description and claims.

The drawings of which there are two sheets illustrate two forms of my record speed adapter.

The presently accepted standard speed of rotation of phonographs and phonograph records is 78 R. P. M. and prior to this time most records and phonographs have been manufactured to operate at this speed. Recently, phonograph records have been developed which are designed to operate at slower speeds, namely, 33⅓ and 45 R. P. M. My device is easily mounted on the standard type of phonograph and turntable by simply placing the device over the turntable pin and is operative to drive a record positioned around the same pin but supported on the device at either of these more recently popularized speeds. The driving force of the record being played is derived from the standard turntable and transmitted to the record by means of a pair of wheels or rollers mounted on the ends of an inclined shaft so that a driving wheel engages the turntable at one radial distance from the turntable pin while the other driven wheel engages the driven record at a pre-determined greater radius from the turntable pin.

My device is capable of assuming wide variety of forms but I have found the examples illustrated to be highly satisfactory both from the standpoint of effective operation and economical manufacture.

Figures 1, 2, 3, 4, 5:
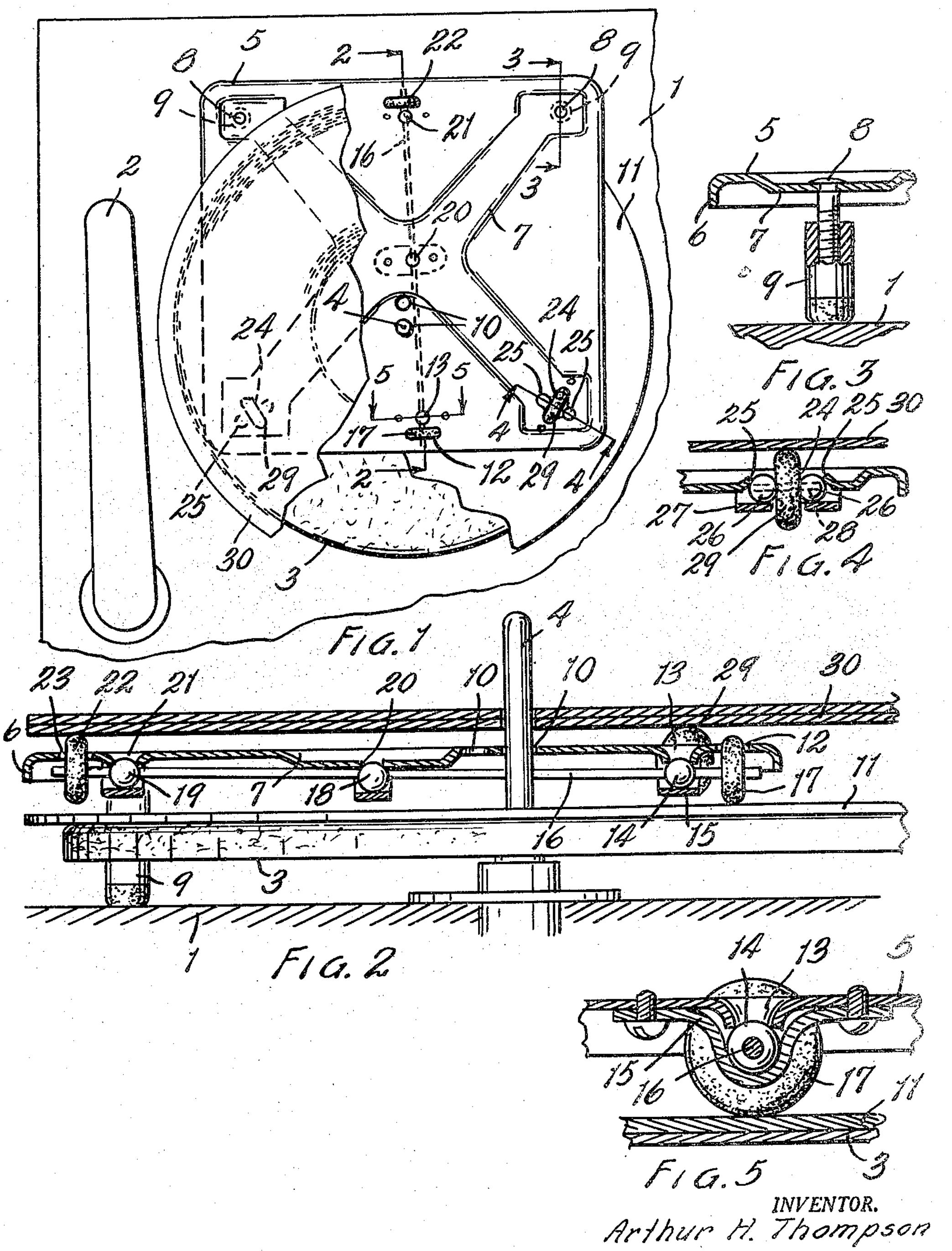
Fig. 1 is a fragmentary plan view of a standard phonograph and turntable with my adapter in place thereon.
Fig. 2 is a fragmentary cross sectional view taken along the plane of the line 2—2 in Fig. 1 and looking in the direction of the arrows.
Fig. 3 is a fragmentary cross sectional view taken along the plane of the line 3—3 in Fig. 1 and looking in the direction of the arrows.
Fig. 4 is a fragmentary cross sectional view taken along the plane of the line 4—4 in Fig. 1 and looking in the direction of the arrows.
Fig. 5 is a fragmentary cross sectional view taken along the plane of the line 5—5 in Fig. 1 and looking in the direction of the arrows.

In Figs. 1 to 5 I have illustrated a phonograph having a top panel 1 on which is mounted a familiar type of pick-up arm 2 and turntable 3. The turntable is driven from any suitable type of mechanism below the top panel and includes a centering pin 4 over which records to be played are centered. My device consists of a generally rectangular plate-like body member 5 having a downturned peripheral flange 6 and a downwardly spaced cruciform embossed area 7. The flange and embossed area serve to stiffen the body member. At two adjacent corners of the body 5 are located downwardly extending threaded studs 8 which are adjustably engaged with supporting legs 9 for supporting one edge of the body 5 from the top panel 1 of the phonograph. The plate-like body 5 forms a pair of centering holes 10 which are preferably located approximately along a perpendicular bisector of the edge of the panel on which the legs 9 are mounted. The holes 10 are so formed that they will selectively receive the centering pin 4 of the turntable and still permit the legs 9 to project downwardly to the top panel of the phonograph outside of the circumference of a record 11 located on the turntable 3.

The panel 5 is slotted as at 12 adjacent to the edge opposite the legs 9 and is further provided with a downwardly extruded circular neck 13 adjacent to the slot. A ball shaped bearing member 14 is secured against the end of the neck 13 by a strap 15 and the bearing is bored to rotatably receive one end of the shaft 16. A driving wheel 17 is fixedly secured to the shaft 16 and is arranged to rest on the record 11 supported on the turntable. I prefer to use the record 11 because most turntables are relatively rough or have embossed ribs therein and the records provides a smooth running surface for the driving wheel 17. The upper portion of the driving wheel 17 projects slightly through the slot 12 although this is not essential to the operation of the device. By permitting the wheel to project through the plate I am able to reduce the vertical thickness of the device which is important in locating the record to be played at an operative level with respect to the pick-up arm 2.

It will be noted that the adjustable legs 9 and driving wheel 17 form a three point or triangular support for the body of the device and that the engagement of the centering pin 4 through one of the holes 10 prevents the body from rotating with the turntable 3.

The shaft 16 extends obliquely upwardly to the opposite edge of the plate approximately between the supporting legs 9. The shaft is supported in additional ball shaped bearings 18 and 19, the plate being provided with a center aperture 20 for the bearing 18 and a relatively shallow extruded neck 21 for the bearing 19. At its upper end the shaft 16 is fixedly secured to a driven wheel 22 which projects upwardly through the slot 23 in the plate. The driving wheel 17 and driven wheel 22 are preferably of the same diameter so that the driven wheel projects substantially further above the plate 5 than the driving wheel 17. It will be noted from Fig. 1 that the shaft 16 extends closely adjacent to the holes 10 so as to just clear the centering pin 4 when the device is installed on the turntable.

The corners of the cruciform embossment 7 opposite from the legs 9 are diagonally slotted as at 24, the slots being provided with circular enlargements 25 for receiving the ball shaped bearing members 26. The bearings 26 are held in the holes provided therefor by plates 27 and serve to support shafts 28 on which the idler wheels 29 are rotatably mounted. It will be noted that the axes of the shafts 28 converge approximately to the centering holes 10 so that the idler wheels 29 will roll freely on the underside of the record 30 centered on the centering pin 4 above the plate 5. The idler wheels 29 project above the plate 5 to approximately the same level as the upper edge of the driven wheel 22 and form, with the driven wheel, a three point support for the record 30 which is to be played.

From the foregoing description it should be apparent that the driving and driven wheels 17 and 22 will be driven from the turntable and record 11 at a certain rotational speed determined by the circumference of the driving wheel and the radius at which the driving wheel contacts the record 11. This imparts a predetermined peripheral speed to the driven wheel 22 and the driven wheel will rotate the driven record 30 at a predeterminable speed calculated by the peripheral speed of the driven wheel 22 and the radius between the centering pin 4 and the driven wheel. If the ratio of the distance between the driving wheel and the centering hole to the distance between the centering hole and the driven wheel is 1 to 2.34, the record 30 will rotate at 33⅓ R. P. M. while the turntable is rotating at 78 R. P. M. If the preceding ratio is changed to 1 to 1.733, the driven record will rotate at 45 R. P. M. I therefore locate the two holes 10 between the driving and driven wheels to provide these ratios so that my device is operative to play the recently developed records. Obviously these ratios can be changed to obtain different record speeds or the relative diameters of the driving and driven wheels can be changed to achieve a predeterminable speed differential between the turntable and the record being played.

Figures 6, 7, 8, 9:
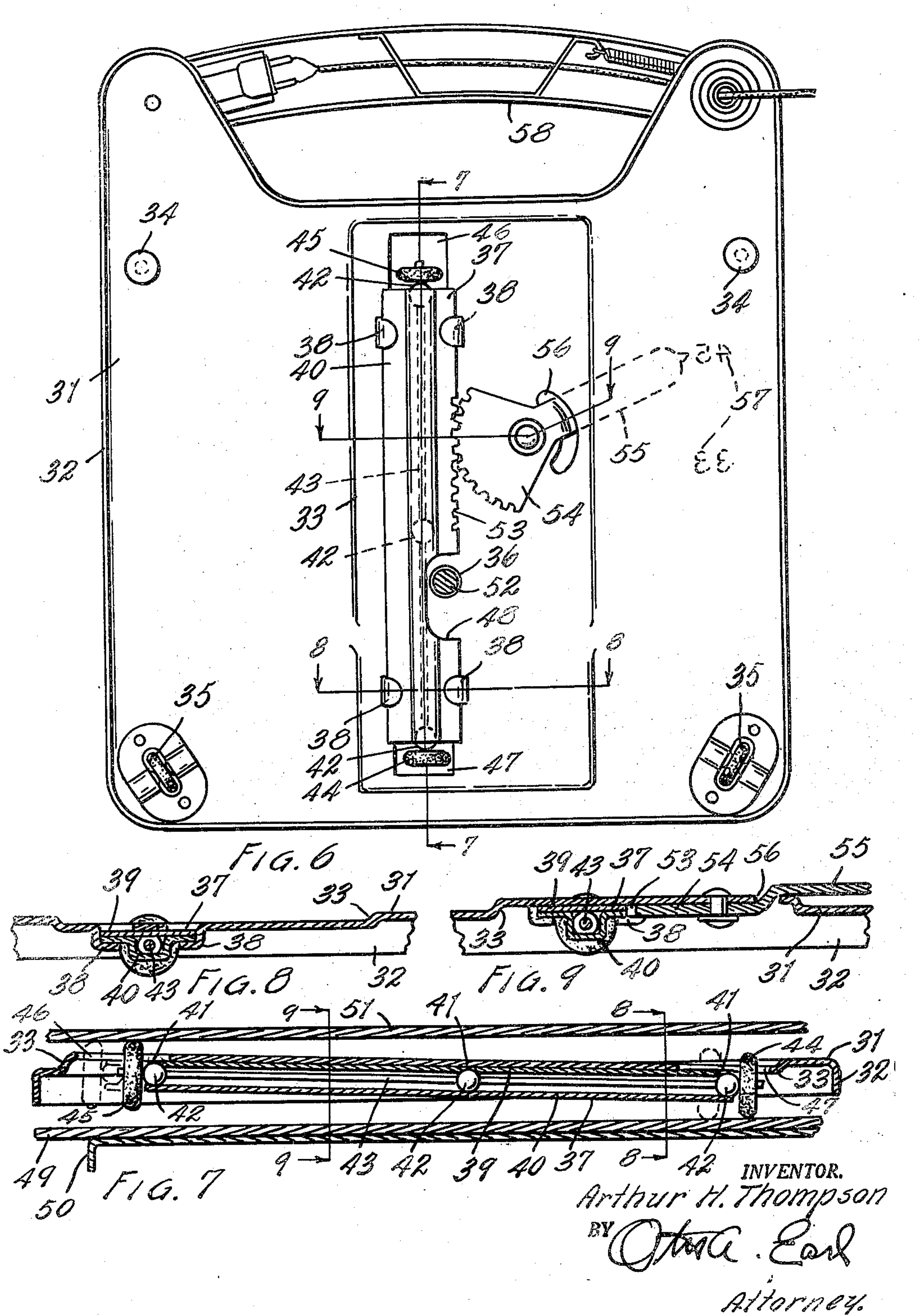
Fig. 6 is a plan view of the underside of a modified form of adapter.
Fig. 7 is a fragmentary cross sectional view taken along the line 7—7 in Fig. 6 and showing the adapter in operative position to drive a record.
Fig. 8 is a fragmentary cross sectional view along the line 8—8 in Fig. 6.
Fig. 9 is a fragmentary cross sectional view along the line 9—9 in Fig. 6.

The modified form of adapter illustrated in Figs. 6 to 9 operates on the same general principle as the adapter just described but is provided with several different features.

The adapter in Figs. 6 to 9 consists of a plate-like body member 31 having a downturned flange 32 around its periphery and provided with an inclined embossed or stamped portion 33 in its center. The inclined portion is illustrated as being formed partially above and partially below the plane of the main panel but this is relatively unimportant. The body panel 31 is provided with a pair of adjustable legs 34 located to either side of one end of the inclined portion and a pair of idler wheels 35 are mounted in the other corners of the panel for rotation about axes which converge to a central pin receiving hole 36 formed in the inclined portion of the body panel.

Slidably secured to the underside of the inclined portion 33 is an elongated housing 37. The housing is slidably held in place by the ears 38 struck downwardly from the inclined portion and bent over the edges of the housing as is most clearly illustrated in Figs. 6 and 8. The housing 37 consists of a base plate 39 which seats flush against the bottom of the inclined portion 33 and a retainer member 40 of U-shaped cross section. The base plate 39 is pierced and notched as at 41 to receive the upper portions of ball shaped bearing members 42. The retainer member 40 operates to hold the bearings in positoion. The bearings 42 rotatably support a shaft 43 having a driving wheel 44 secured to its lower end and a driven wheel 45 secured to its upper end. The inclined portion 33 forms a pair of openings which for convenience may be referred to as an upper opening 46 and a lower opening 47. The wheels 44 and 45 project through the openings 46 and 47.

It will be noted that the housing 37 is cut away or notched as at 48 adjacent to the hole 36 so that the shaft 43 can be located closely adjacent to the hole 36. The adapter thus far described operates in the same fashion as the previous form of adapter with the driving wheel 44 engaging a record 49 on the turntable 50 of a standard phonograph and with the driven wheel 45 projecting above the body to support a record 51 to be played.

In order to provide for variations of the speed ratios between the turntable 50 and the record 51, the housing 37 is slidable longitudinally so that the hole 36 and the turntable pin 52 positioned therein may be located at different points between the driving and driven wheels. Movement of the housing is accomplished by the rack teeth 53 cut in one edge of the base plate 39 and retainer member 40 and the segmental gear 54. The gear 54 is pivotally secured to the underside of the inclined portion 33 and is provided with an operating arm 55 passed upwardly through a slot 56 to the upper side of the adapter. Indicia 57 may be provided on the top of the body panel to indicate the adjustment of the slide member.

Since some phonographs are provided with pickup arms having permanent needles which are inoperative with the new type records, the adapter is provided with an auxiliary pickup arm 58 which may be provided with the proper type of needle and which may be balanced to function properly with the new records.

The modified form of adapter thus not only provides for major changes in the speed ratio between the turntable and the record to be played but also permits smaller speed adjustments to suit the operator. Both forms of the adapter are operative to play either 33⅓ R. P. M. or 45 R. P. M. records from a standard 78 R. P. M. phonograph turntable. Some of the new records have an oversized hole which will not fit the standard phonograph centering pin but obviously a suitable spacer disk or stud can be placed over the regular centering pin to center the record on my adapter.

Having thus described my invention what I claim as new and desire to secure by Letters Patent is:

1. A record speed adapter comprising a generally rectangular plate-like body member having stiffening ribs and a stiffening flange therearound, a pair of depending screw members mounted one in each of two adjacent corners of said body member, supporting legs adjustably secured to said screws, spaced centering holes in said body located along a line approximately perpendicular to a line between said legs, spaced bearing holes formed in said body along a line slightly offset from the line of said centering holes, the edges of some of said bearing holes being downwardly extruded, ball shaped bearing members positioned against the under edges of said bearing holes, straps secured to said plate and retaining said bearing members in position, a shaft journaled in said bearing members and inclined upwardly to adjacent the side of said body between said legs, a driving wheel fixedly secured to the lower end of said shaft and projecting upwardly through a slot in said body, a driven wheel fixedly secured to the upper end of said shaft and projecting upwardly through a slot in said body to a higher level than said driving wheel, said driving and driven wheels being of equal diameter, idler wheels mounted in the corners of said body opposite said legs and projecting through slots in said body to the level of said driven wheel, ball shaped bearing members for said idler wheels positioned against the edges of openings in said body, clips secured to said body and securing said last bearings in position, the axes of said idler wheels being disposed along lines converging toward said centering holes, said centering holes being disposed closely adjacent to said shaft and being located therealong at different unequal distances from said driving and driven wheels.

2. A record speed adapter comprising a generally rectangular plate-like body member having stiffening ribs and a stiffening flange therearound, vertically adjustable legs mounted one in each of two adjacent corners of said body member, spaced centering holes formed in said body and located along a line oblique to a line between said legs, bearing holes formed in said body along a line slightly offset from the line of said centering holes, the edges of some of the bearing holes being downwardly offset from the plane of said body, self aligning bearing members positioned against the under edges of said bearing holes, straps secured to said plate and retaining said bearing members in position, a shaft journaled in said bearing members and inclined upwardly to adjacent the side of said body between said legs, a driving wheel fixedly secured to the lower end of said shaft with its lower side positioned substantially below said body, a driven wheel fixedly secured to the upper end of said shaft with its upper side positioned at a higher level than said body and driving wheel, said wheels being of equal diameter, idler wheels mounted in the corners of said body opposite said legs with their upper sides level with said driven wheel, the axes of said idler wheels being disposed along lines converging toward said centering holes, said centering holes being disposed closely adjacent to said shaft and being located therealong at different unequal distances from said driving and driven wheels.

3. A record speed adapter comprising a generally rectangular plate-like body member having stiffening ribs and a stiffening flange therearound, vertically adjustable legs mounted one in each of two adjacent corners of said body member, spaced centering holes formed in said body and located along a line oblique to a line between said legs, bearing holes formed in said body along a line slightly offset from the line of said centering holes, the edges of some of the bearing holes being downwardly offset from the plane of said body, self aligning bearing members positioned against the under edges of said bearing holes, straps secured to said plate and retaining said bearing members in position, a shaft journaled in said bearing members and inclined upwardly to adjacent the side of said body between said legs, a driving wheel fixedly secured to the lower end of said shaft with its lower side position substantially below said body, a driven wheel fixedly secured to the upper end of said shaft with its upper side positioned at a higher level than said body and driving wheel, idler wheels mounted in the corners of said body opposite said legs with their upper sides level with said driven wheel, the axes of said idler wheels being disposed along lines converging toward said centering holes, said centering holes being disposed closely adjacent to said shaft and being located therealong at different unequal distances from said driving and driven wheels.

4. A record speed adapter comprising a plate-like body member, a pair of vertically adjustable leg members mounted along one side of said body member, spaced centering holes formed in said body and located along a line oblique to a line between said legs, bearing members on said body along a line slightly offset from the line of said centering holes, a shaft journaled in said bearing members and inclined upwardly toward the side of said body between said legs, a driving wheel fixedly secured to the lower end of said shaft and projecting downwardly below said body, a driven wheel fixedly secured to the upper end of said shaft and projecting upwardly above said body, said wheels being of equal diameter, spaced idler wheels mounted on said body and projecting upwardly to the level of said driven wheel, said idler wheels and driven wheel forming supports for a record to be played, the axes of said idler wheels being disposed along lines converging toward said centering holes, said centering holes being disposed closely adjacent to said shaft and being located therealong at different unequal distances from said driving and driven wheels.

5. A record speed adapter comprising a body member, a pair of leg members mounted along one side of said body member, spaced centering holes formed in said body and located along a line oblique to a line between said legs, bearing members on said body along a line slightly offset from the line of said centering holes, a shaft journaled in said bearing members and inclined upwardly toward the side of said body between said legs, a driving wheel fixedly secured to the lower end of said shaft and projecting downwardly below said body, a driven wheel fixedly secured to the upper end of said shaft and projecting upwardly above said body, spaced idler wheels mounted on said body and projecting upwardly to the level of said driven wheel, said idler wheels and driven wheel forming supports for a record to be played, the axes of said idler wheels being disposed along lines converging toward said centering holes, said centering holes being disposed closely adjacent to said shaft and being located therealong at different unequal distances from said driving and driven wheels.

6. A record speed adapter comprising a generally flat body, depending means on said body forming a line support for one side thereof, a driving wheel rotatably mounted on said body and projecting therebelow, said driving wheel being arranged to form a spaced point support for said body in cooperation with said depending means, a shaft fixedly secured to said driving wheel and inclined upwardly toward the line supported side of said body, bearings for said shaft carried on said body, a driven wheel secured to the upper end of said shaft and projecting above said body, idler wheels rotatably supported by said body and projecting thereabove, said idler wheels being mounted on axes converging to a central point in the vicinity of the axis of said shaft, said idler wheels and driven wheel forming a plane support for a record to be played, said body having a pair of centering holes formed therein and adapted to selectively pass the centering pin of a phonograph and located closely adjacent to said shaft and the converging axes of said idler wheels, said centering holes being located between said driven wheel and said driving wheel so that the ratios of the distances between each individual hole and said driven wheel and said driving wheel are respectively 2.34 and 1.733 to 1.

7. A record speed adapter comprising a body, depending means on said body forming a support for one side thereof, a driving wheel rotatably mounted on said body and projecting therebelow, said driving wheel being arranged to form a support for said body in cooperation with said depending means, a shaft fixedly secured to said driving wheel and inclined upwardly with respect to said body, a driven wheel secured to the upper end of said shaft and projecting above said body, idler wheels rotatably supported by said body and projecting thereabove, said idler wheels being mounted on axes converging to a central point in the vicinity of the axis of said shaft, said idler wheels and driven wheel forming a plane support for a record to be played, said body having a pair of centering holes formed therein and adapted to selectively pass the centering pin of a phonograph and located closely adjacent to said shaft and the converging axes of said idler wheels, said centering holes being located between said driven wheel and said driving wheel so that the ratios of the distances between each individual hole and said driven wheel and said driving wheel are respectively 2.34 and 1.733 to 1.

8. A record speed adapter comprising a body, depending means on said body forming a support therefor, a driving wheel rotatably mounted on said body and projecting therebelow, said driving wheel being arranged to form a second support for said body in cooperation with said depending means, a shaft fixedly secured to said driving wheel and inclined upwardly with respect to said body, a driven wheel secured to the upper end of said shaft and projecting above said body, other wheels rotatably supported by said body and projecting thereabove, said other wheels being mounted on axes converging to a central point in the vicinity of the axis of said shaft, said other wheels and driven wheel forming a support for a record to be played, said body having a centering hole formed therein adapted to pass the centering pin of a phonograph and located closely adjacent to said shaft and the converging axes of said other wheels.

9. A record speed adapter for a phonograph having a turntable and a centering pin comprising, a body member having a pair of holes formed therein to selectively receive said pin, a support on said body for supporting said body from said phonograph along a line, a drive wheel rotatably supported by said body and having its lower portion positioned below said body to be supported by said turntable and be driven thereby, said support and said driving wheel cooperating to form a stable support for said body, a pair of spaced idler wheels rotatably supported on said body and projecting thereabove to engage a driven record positioned over said pin and above said body, a driven wheel rotatably mounted on said body and projecting thereabove to support and drive said driven record, said driven wheel and idler wheels locating the plane of said driven record approximately parallel to the plane of said turntable, and a shaft connecting said driving and said driven wheels for equal angular speed, said shaft extending at an angle with respect to the plane of said driven record.

10. A record speed adapter for a phonograph having a turntable and a centering pin comprising, a body member having a pair of holes formed therein to selectively receive said pin, a support on said body for supporting said body from said phonograph, a driving wheel rotatably supported by said body and having its lower portion positioned below said body to be supported by said turntable and be driven thereby, said support and said driving wheel cooperating to form a support for said body, a pair of spaced idler wheels rotatably supported on said body and projecting thereabove to engage a driven record positioned over said pin and above said body, a driven wheel rotatably mounted on said body and projecting thereabove to support and drive said driven record, said driven wheel and idler wheels locating the plane of said driven record, and a shaft connecting said driving and said driven wheels for equal angular speed, said shaft extending at an angle with respect to the plane of said driven record.

11. A record speed adapter for a phonograph having a turntable and a centering pin comprising, a body member having a hole formed therein to receive said pin, a support on said body for supporting said body from said phonograph, a driving wheel rotatably supported by said body and having its lower portion positioned below said body to be supported by said turntable and be driven thereby, said support and said driving wheel cooperating to form a support for said body, a pair of spaced idler wheels rotatably supported on said body and projecting thereabove to engage a driven record positioned over said pin and above said body, a driven wheel rotatably mounted on said body and projecting thereabove to support and drive said driven record, said driven wheel and idler wheels locating the plane of said driven record, and a shaft connecting said driving and said driven wheels for equal angular speed, said shaft extending at an angle with respect to the plane of said driven record.

12. In a record speed adapter for a phonograph, a rotatable member of substantial axial length, a body on which said member is rotatably mounted, said member having a circular driving portion at one end thereof positioned below said body and being adapted to be supported by and driven from the turntable of said phonograph, a circular driven portion on the other end of said member positioned above said body and being adapted to support and drive a record to be played, a support on said body engageable with a fixed portion of said phonograph to cooperate with the driving portion of said member in supporting said member with the driven portion thereof out of contact with said turntable, and a second rotatable member carried by said body and cooperative with said driven portion of said first member to support said record out of contact with said body and said driving portion, said body having a hole formed therein closely adjacent to the axis of said first member and adapted to pass the centering pin of said phonograph and located at unequal distances from said driving and driven portions of said first member, said driving and driven portions being of equal diameter.

13. In a record speed adapter for a phonograph, a rotatable member of substantial axial length, a body on which said member is rotatably mounted, said member having a circular driving portion at one end thereof positioned below said body and being adapted to be supported by and driven from the turntable of said phonograph, a circular driven portion on the other end of said member positioned above said body and being adapted to support and drive a record to be played, a support on said body engageable with a fixed portion of said phonograph to cooperate with the driving portion of said member in supporting said member with the driven portion thereof out of contact with said turntable, and a second rotatable member carried by said body and cooperative with said driven portion of said first member to support said record out of contact with said body and said driving portion, said body having a hole formed therein closely adjacent to the axis of said first member and adapted to pass the centering pin of said phonograph.

14. A record speed adapter for a phonograph comprising a plate-like body member having an inclined portion in the center thereof, said inclined portion having a pin receiving hole formed therein centrally of said body member, idler wheels mounted at two spaced points along one side of said body member on opposite sides of said inclined position and rotatable about axes converging toward said hole, adjustable legs on said body member at the opposite side thereof from said idler wheels, a housing slidably mounted on the underside of said inclined portion of said body member and slidable longitudinally of said inclined portion on a line between said idler wheels, a shaft carried by said housing parallel to the line of sliding movement of said housing and closely adjacent to the axis of said hole, a driving wheel on said shaft and projecting below said body member to be supported and driven by a turntable, a driven wheel on the other end of said shaft and projecting above said body member to frictionally drive a record to be played and to cooperate with said idler wheels in supporting the record to be played, the side of said housing being notched adjacent to the axis of said hole whereby the center pin of a turntable may project through said hole, and means for moving said housing and shaft relative to said hole, said means comprising a rack formed on said housing and a cooperative segment pivoted on said body member and having an operating lever projecting over the top surface of said body member.

15. A record speed adapter for a phonograph comprising a plate-like body member, said body member having a pin receiving hole formed therein centrally thereof, idler wheels mounted at two spaced points along one side of said body member and rotatable about axes converging toward said hole, adjustable legs on said body member at the opposite side thereof from said idler wheels, a housing slidably mounted on the underside of said body member and slidable longitudinally of the housing on a line extending transversely between said idler wheels, a shaft carried by said housing parallel to the line of sliding movement of said housing and closely adjacent to the axis of said hole, a driving wheel on said shaft and projecting below said body member to be supported and driven by a turntable, a driven wheel on the other end of said shaft and projecting above said body member to frictionally drive a record to be played and to cooperate with said idler wheels in supporting the record to be played, and means for moving said housing and shaft relative to said hole, said means comprising a rack formed on said housing and a cooperative segment pivoted on said body member and having an operating lever.

16. A record speed adapter for a phonograph comprising a body member having a pin receiving hole formed therein, idler wheels mounted at spaced points on said body member spaced from each other and said hole and rotatable about axes converging toward said hole, a support on said body member projecting downwardly therefrom along a line on the opposite side of said hole from said idler wheels, a shaft rotatably mounted on the underside of said body member and slidable longitudinally of its axis on a line between said idler wheels, said shaft lying closely adjacent to the axis of said hole, a driving wheel on said shaft and projecting below said body member to be supported and driven by a turntable, a driven wheel on the other end of said shaft and projecting above said body member to frictionally drive a record to be played and to cooperate with said idler wheels in supporting the record to be played, said wheels being located on opposite sides of said hole, and means for longitudinally moving said shaft relative to said hole.

17. A record speed adapter comprising a body member having a pin receiving hole formed therein, stationary supports on said body member for supporting one side thereof from a fixed panel, a shaft carried by said body member and having a driving wheel fixed on one end thereof adapted to be supported from a turntable to be rotated thereby and to cooperate with said supports in supporting said body, a driven wheel secured to said shaft and projecting above said body member to frictionally drive and support a record, idler wheels carried by said body member and rotatable about axes extending generally radially from said hole, said idler wheels cooperating with said driven wheel to support the record, said shaft being located closely adjacent to the axis of said hole with said driving and driven wheels disposed on opposite sides of said hole, and means for moving said shaft and said driving and driven wheels relative to said body member to vary the position of said hole relative to said driving and driven wheels.

18. A record speed adapter comprising a body member having a pin receiving hole, a stationary support on said body member for supporting one side thereof from a fixed panel, a shaft carried by said body member and having a driving wheel fixed on one end thereof adapted to be supported from a turntable to be rotated thereby and to cooperate with said support in supporting said body, a driven wheel secured to said shaft and projecting above said body member to frictionally drive and support a record, an idler wheel carried by said body member and rotatable about an axis extending generally radially from said hole, said idler wheel cooperating with said driven wheel to support the record, said shaft being located closely adjacent to the axis of said hole with said driving and driven wheels disposed on opposite sides of said hole, and means for moving said shaft and said driving and driven wheels relative to said body member to vary the position of said hole relative to said driving and driven wheels.

19. A record speed adapter comprising a body member having a pin receiving hole formed therein, support means on said body member for supporting one side thereof from a fixed panel, a driving wheel rotatably mounted on said body member in a plane generally perpendicular to said body member and having its lower portion positioned below said body member and adapted to be supported from a turntable to be rotated thereby, said driving wheel cooperating with said support means in supporting said body member, a driven wheel rotatably mounted on said body member in a plane generally perpendicular to said body member and having its upper portion projecting above said body member to frictionally drive and support a record, shaft means connecting said driving and driven wheels for equi-angular rotation, said driving and driven wheels being rotatable about axes extending approximately radially from said hole, idler wheels rotatably mounted on said body in planes generally perpendicular thereto and having their axes extending generally radially from said hole, said idler wheels cooperating with said driven wheel to support the record, and means for moving one of said driving and driven wheels along its axis of rotation whereby the ratio of the radial distances between said hole and said driving and driven wheels may be varied.

ARTHUR H. THOMPSON.

REFERENCES CITED

The following references are of record in the file of this patent:

UNITED STATES PATENTS

| Number | Name | Date |
|---|---|---|
| 664,028 | Ryd | Dec. 18, 1900 |
| 1,384,357 | Wills | July 12, 1921 |
| 1,547,768 | Little | July 28, 1925 |